(12) United States Patent
Saracino et al.

(10) Patent No.: US 12,123,941 B2
(45) Date of Patent: Oct. 22, 2024

(54) MULTI-ELEMENT APERTURE FOR IDENTIFICATION FRIEND OR FOE (IFF) TRANSPONDER SYSTEMS

(71) Applicant: BAE SYSTEMS Information and Electronic Systems Integration Inc., Nashua, NH (US)

(72) Inventors: Robert F. Saracino, Lindenhurst, NY (US); John M. Cosenza, Coram, NY (US); Richard J. Lavery, Huntington, NY (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 110 days.

(21) Appl. No.: 18/189,571

(22) Filed: Mar. 24, 2023

(65) Prior Publication Data
US 2024/0319361 A1    Sep. 26, 2024

(51) Int. Cl.
*G01S 13/78* (2006.01)
*G01S 13/76* (2006.01)

(52) U.S. Cl.
CPC ............ *G01S 13/78* (2013.01); *G01S 13/762* (2013.01); *G01S 13/767* (2013.01)

(58) Field of Classification Search
CPC ....... G01S 13/78; G01S 13/762; G01S 13/767
See application file for complete search history.

(56) References Cited

U.S. PATENT DOCUMENTS

| | | | |
|---|---|---|---|
| 3,713,167 | A | 1/1973 | David |
| 5,280,285 | A | 1/1994 | Curtis et al. |
| 6,140,982 | A | 10/2000 | Fuchter et al. |
| 6,313,783 | B1 | 11/2001 | Kuntman et al. |
| 7,046,186 | B2 | 5/2006 | Rosenberg et al. |
| 7,705,770 | B2 | 4/2010 | Wahl |

(Continued)

FOREIGN PATENT DOCUMENTS

| | | |
|---|---|---|
| EP | 0913706 B1 | 3/2004 |
| EP | 2911240 A1 | 8/2015 |

(Continued)

OTHER PUBLICATIONS

International Search Report, PCT/US24/20831, mailed Jun. 26, 2024, 10 pages.

*Primary Examiner* — Timothy X Pham
(74) *Attorney, Agent, or Firm* — Scott J. Asmus (57) ABSTRACT

Techniques are provided for an Identification Friend or Foe (IFF) transponder. A system implementing the techniques according to an embodiment includes an antenna array configured to operate in an omnidirectional mode and a steered directional mode. The system also includes a receiver configured to receive signals provided through the antenna array while operating in the omnidirectional mode and a detector configured to detect an IFF interrogation message in the received signals. The system further includes an angle of arrival (AOA) estimator configured to operate the antenna array in the steered directional mode to estimate an AOA of the IFF interrogation message. The system further includes a transmitter configured to operate the antenna array in the steered directional mode to transmit an IFF response message in the estimated AOA direction. The transmit power of the IFF response message may be based on, for example, the steering gain of the antenna array.

20 Claims, 6 Drawing Sheets

(56) References Cited

U.S. PATENT DOCUMENTS

| | | |
|---|---|---|
| 8,072,369 B2 | 12/2011 | Lackey |
| 8,179,302 B2 | 5/2012 | Wajer |
| 8,232,911 B1 | 7/2012 | Pedersen |
| 8,441,392 B2 | 5/2013 | Descharles et al. |
| 10,162,040 B1 | 12/2018 | McKivergan |
| 10,823,838 B2 | 11/2020 | Billaud |
| 2011/0102236 A1 | 5/2011 | Wajer |
| 2011/0115674 A1 | 5/2011 | Lackey |
| 2011/0309966 A1 | 12/2011 | Descharles et al. |
| 2013/0099895 A1 | 4/2013 | Harpak et al. |
| 2019/0353772 A1 | 11/2019 | Sundell et al. |

FOREIGN PATENT DOCUMENTS

| | | |
|---|---|---|
| KR | 2104644 B1 | 4/2020 |
| KR | 2125894 B1 | 6/2020 |
| WO | WO1993020460 A1 | 10/1993 |
| WO | WO2001027654 A1 | 4/2001 |

MULTI-ELEMENT APERTURE FOR IDENTIFICATION FRIEND OR FOE (IFF) TRANSPONDER SYSTEMS

FIELD OF DISCLOSURE

The present disclosure relates to IFF transponder systems, and more particularly to multi-element aperture IFF transponder systems.

BACKGROUND

IFF transponders are configured to respond to challenge queries from an IFF interrogator. The response provides information to the interrogator that allows the platform, such as an aircraft or ship, to be identified as friendly. The IFF response or reply message is transmitted at a power level sufficient to be detected and decoded by the interrogator. Unfortunately, however, it is also possible for adversaries to receive and exploit these response messages.

Although the following Detailed Description will proceed with reference being made to illustrative embodiments, many alternatives, modifications, and variations thereof will be apparent in light of this disclosure.

DETAILED DESCRIPTION

Techniques are provided herein for a IFF transponder system. In an example, the IFF transponder system is configured to determine a direction of an IFF interrogator and to transmit a response in that direction. The response may be transmitted at a reduced power level. As noted above, IFF transponders are configured to respond to interrogation challenges from an IFF interrogator. The response provides information to the interrogator that allows the platform, such as an aircraft or ship, to be identified as friendly. Generally, the IFF response or reply message is transmitted in an omnidirectional manner at a power level sufficient to be detected and decoded by the interrogator. Unfortunately, however, it is also possible for adversaries to receive and exploit these response messages.

To this end, and in accordance with an embodiment of the present disclosure, a directional IFF transponder system is disclosed which employs an antenna array that can be operated in both an omnidirectional mode and a steerable direction mode. The omnidirectional mode can be used for receiving messages from IFF interrogators, while the steerable direction mode can be used to determine an angle of arrival (AOA) of the received messages and for transmission of response messages in that direction. Because the transmitted response is steered towards the interrogator, it benefits from the antenna gain pattern in the steered direction and can thus be transmitted at a lower power level compared to an omnidirectional response transmission. This reduced power level, combined with the directionality, also reduces the probability of interception by unintended or adversarial parties. The directional IFF transponder system can be used on, or incorporated into, for example, the radar and/or communication system of any mobile platform that employs IFF capabilities including, such as aircraft, ships, and ground vehicles, as well as any number of fixed-location platforms.

In accordance with an embodiment, the directional IFF transponder system includes an antenna array configured to operate in both an omnidirectional mode and a steered directional mode. The system also includes a receiver configured to receive signals provided through the antenna array while operating in the omnidirectional mode. The system further includes a detector configured to detect an IFF interrogation message in the received signals. The system further includes an AOA estimator configured to operate the antenna array in the steered directional mode to estimate an AOA of the IFF interrogation message. The system further includes a transmitter configured to operate the antenna array in the steered directional mode to transmit an IFF response message in the estimated AOA direction. The IFF response message may be transmitted as a reduced power level IFF response message. Such a beneficial reduction in transmit power is based on the steering gain of the antenna array. In some embodiments, the steered directional mode may also be used to mitigate interference from jamming signals, as will be explained in greater detail below.

It will be appreciated that the techniques described herein may provide improved performance with lower power consumption (and associated lower cost) along with greater security, compared to systems that broadcast responses omnidirectionally. Additionally, the reduced power transmission decreases heat dissipation which improves system reliability which is a function of thermal stress. Numerous embodiments and applications will be apparent in light of this disclosure.

System Architecture

Figure 1:
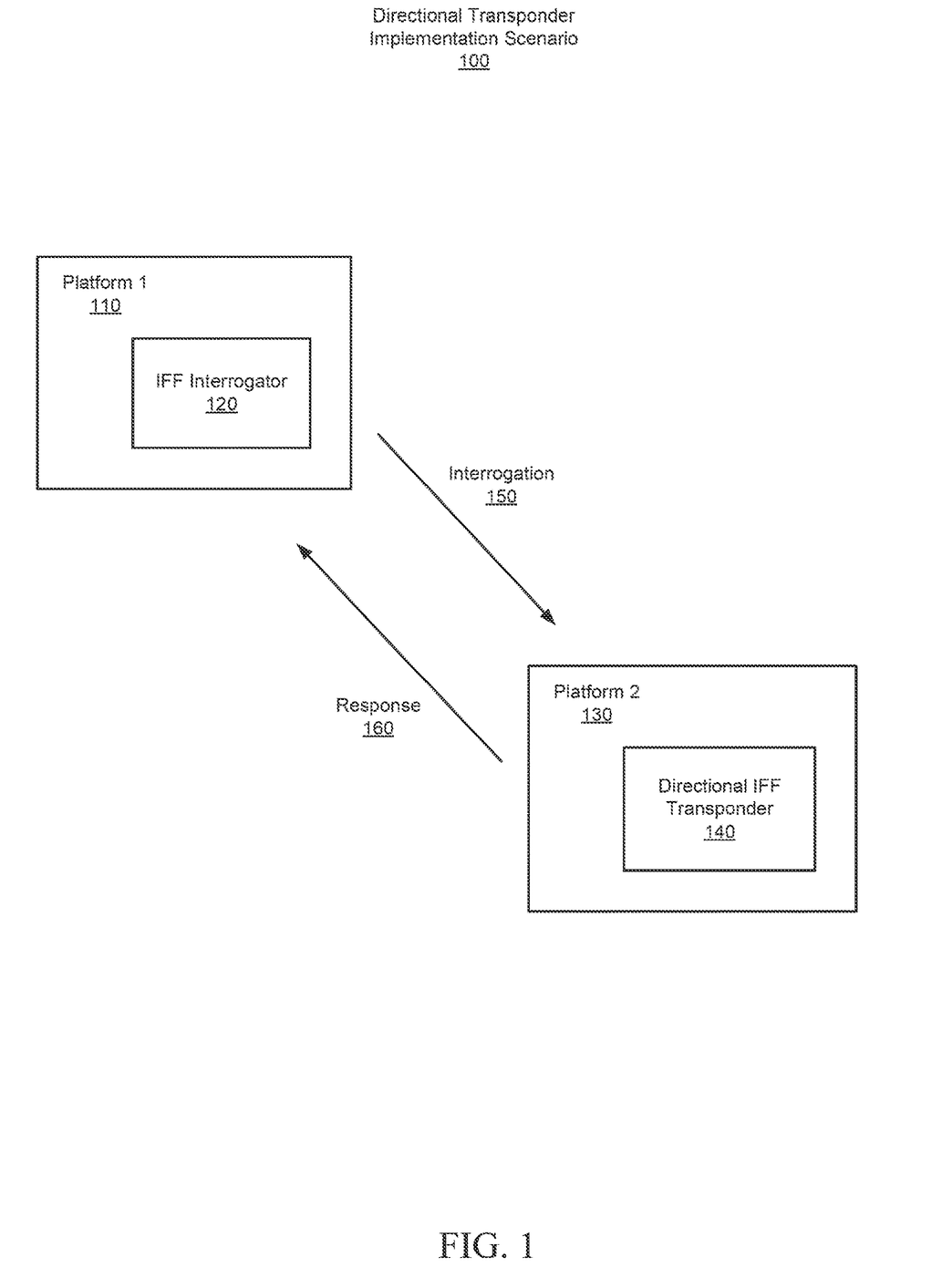
FIG. 1 illustrates a scenario for implementation of a directional IFF transponder system, in accordance with certain embodiments of the present disclosure.

FIG. 1 illustrates a scenario 100 for implementation of a directional IFF transponder system 140, in accordance with certain embodiments of the present disclosure. The scenario 100 is shown to include a first platform 110 comprising an IFF interrogator 120 that is configured to transmit interrogation or challenge messages 150 to other platforms. The scenario 100 also shows a second platform 130 comprising a directional IFF transponder 140 configured to transmit an IFF response message 160 at reduced power and in the direction of the interrogator platform 110, as will be described in greater detail below.

Figure 2:
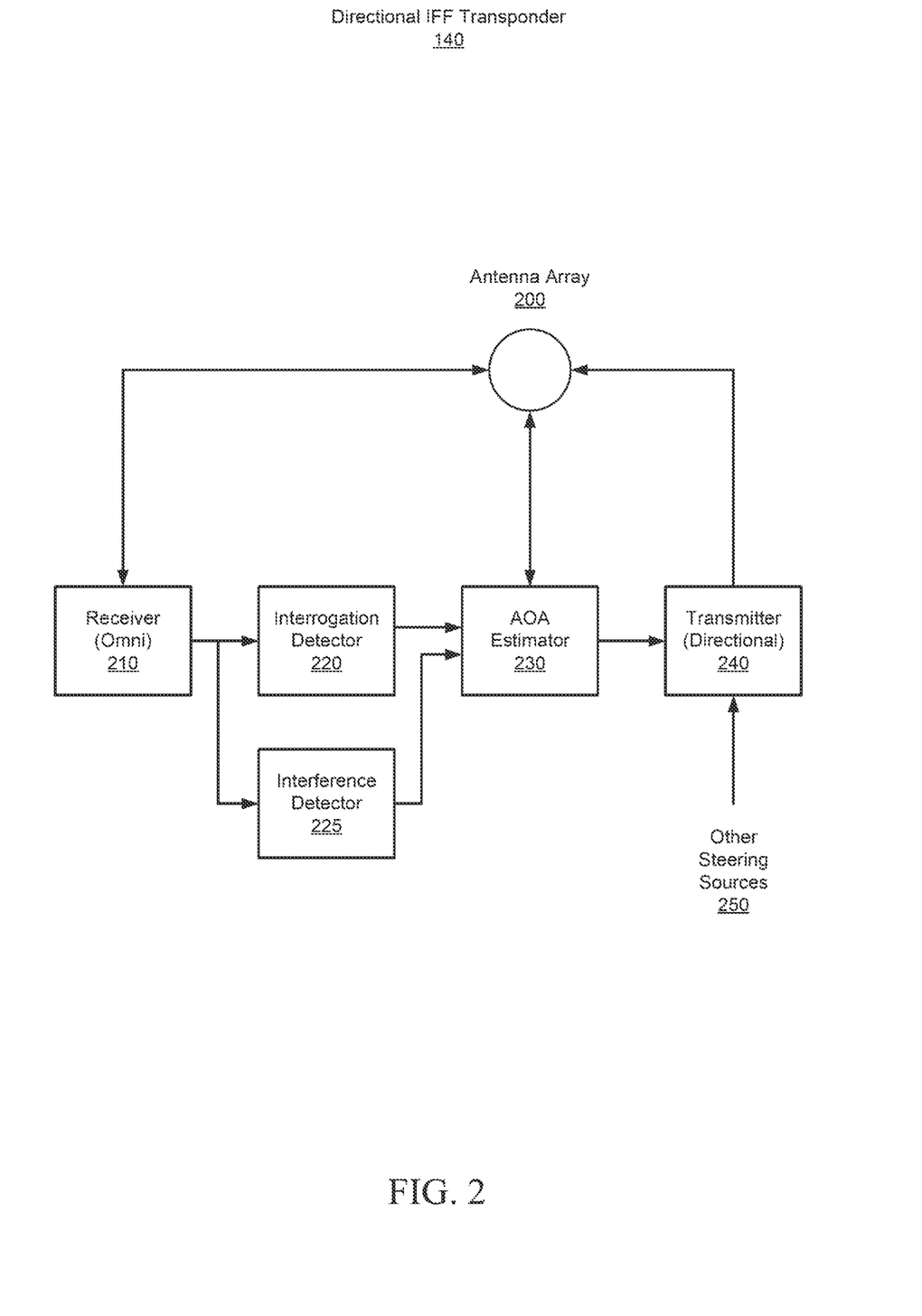
FIG. 2 is a block diagram of the directional IFF transponder system of FIG. 1, configured in accordance with certain embodiments of the present disclosure.

FIG. 2 is a block diagram of the directional IFF transponder system 140 of FIG. 1, configured in accordance with certain embodiments of the present disclosure. The IFF transponder system 140 is shown to include an antenna array 200, a receiver 210, an interrogation detector 220, an interference detector 225, an angle of arrival (AOA) estimator 230, and a transmitter 240.

The antenna array 200 is configured to operate in both an omnidirectional mode and a steerable direction mode. In some embodiments, the antenna array comprises four elements that provide an omnidirectional beam pattern, along with a fifth element that can be activated to induce a steerable null in the beam pattern which can be steered to any desired direction, as will be described in greater detail below in connection with FIG. 3.

The receiver 210 is configured to control the antenna array to operate in the omnidirectional mode (e.g., using only four of the antenna elements) and to receive signals provided through the antenna array while operating in the omnidirectional mode. Omnidirectional mode is used for this first phase of operation since the direction of the IFF interrogator is not initially known.

The interrogation detector 220 is configured to detect an IFF interrogation message in the received signals. Detection of IFF interrogation messages may be accomplished using any suitable technique, in light of the present disclosure.

In some embodiments, an interference detector 225 may also be employed. The interference detector 225 is configured to detect an interfering or jamming signal that may be present in the received signals. Detection of interfering signals may be accomplished using any suitable technique, in light of the present disclosure.

The AOA estimator 230 is configured to control the antenna array to operate in the steered directional mode to estimate an AOA of the detected IFF interrogation message (or the interfering signal, if one is detected). The AOA estimator is configured to sweep the steerable null through a range of angles (e.g., up to a full 360 degrees) to determine the angle that is associated with the lowest received power of the IFF interrogation message or interfering signal. The lowest received power occurs when the null is steered in the direction of the signal source, and that direction can then be used as the estimates AOA.

The transmitter 240 is configured to control the antenna array to continue operating in the steered directional mode, and to transmit a reduced power IFF response message in the estimated AOA direction. For transmission, the null is steered to a direction opposite the estimated AOA so that the maximum gain of the antenna array is directed towards the estimated AOA. The transmit power reduction is based on the steering gain of the antenna array. In some embodiments, the steering gain of the antenna array is in the range of 3 dB to 6 dB and the transmit power reduction is proportional to that steering gain. For example, if the steering gain is 6 decibels (dB) then the transmit power can be reduced by 6 dB from what would otherwise be required. For example, IFF transponders are generally required to transmit at a nominal RF output power level of 500 Watts. However, by exploiting the 6 dB gain of the directional antenna, the transmit power can be reduced to 125 Watts.

In the situation where an interfering signal is detected, and an associated AOA of the interfering signal is estimated, the transmitter 240 is configured to control the antenna array to steer the null in the direction of the interfering signal source (e.g., a jamming platform), while transmitting the IFF response message.

The Transmitter 240 can also be configured to steer transmission in a direction provided by other steering sources 250. For example, the transmitter 240 may be configured to steer an IFF Interrogation message in the direction of a GPS track received from an Automatic Dependent Surveillance Broadcast (ADS-B) message, for systems that employ directional interrogation transmissions such as aircraft collision avoidance systems.

Figure 3:
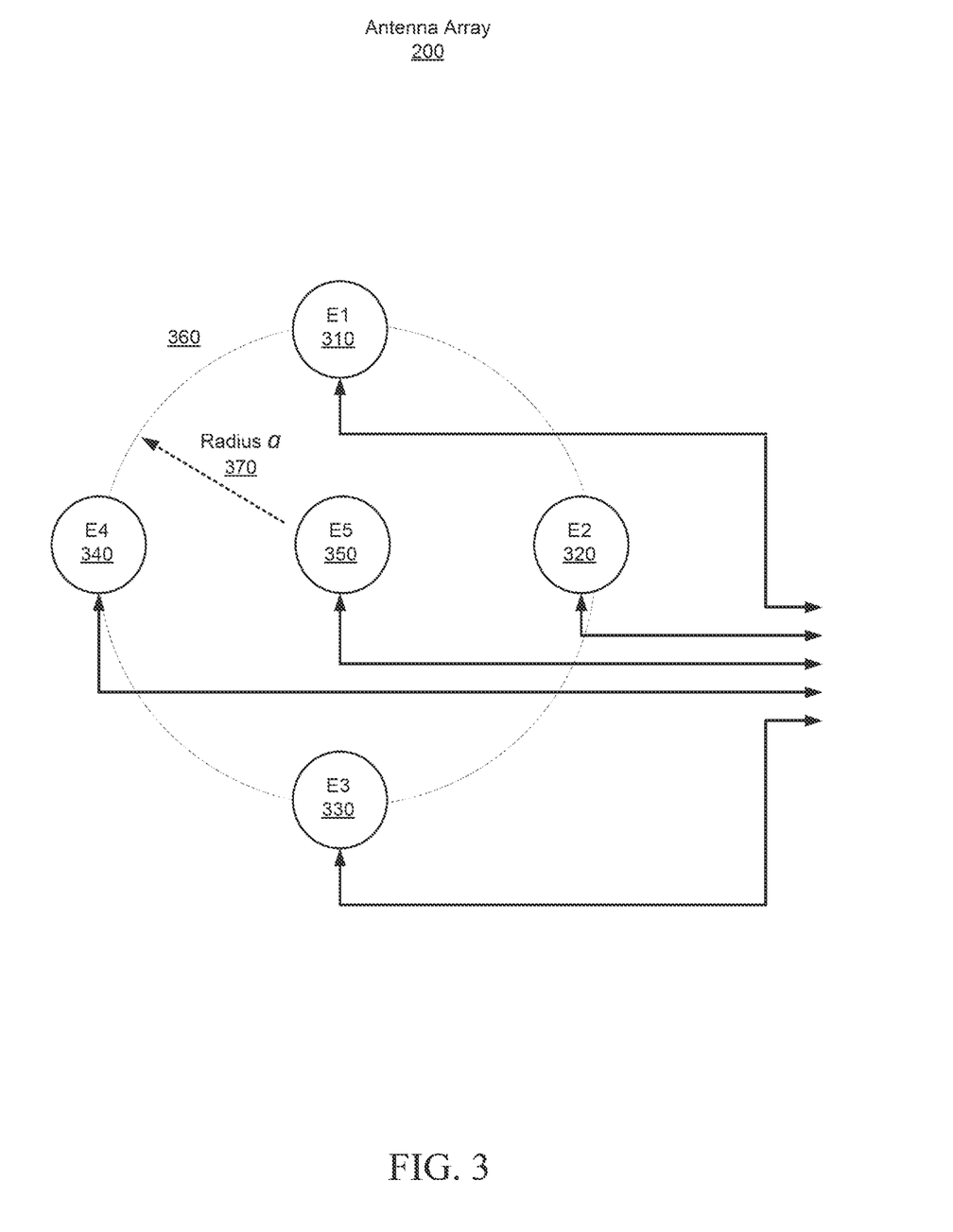
FIG. 3 illustrates an antenna array of the directional IFF transponder system of FIG. 1, configured in accordance with certain embodiments of the present disclosure.

FIG. 3 illustrates an antenna array 200 of the directional IFF transponder system of FIG. 1, configured in accordance with certain embodiments of the present disclosure. The antenna array 200 of this example is shown to include four outer antenna elements E1 310, E2 320, E3 330, E4 340 disposed in a circular pattern 360 of radius a 370. A fifth inner antenna element E5 350 is disposed within the circular pattern. The four antenna elements disposed in the circular pattern are employed during operation of the antenna array in the omnidirectional mode, while the fifth antenna element is unused. The beam pattern, or gain g, as a function of azimuth angle ϕ, for the four element array can be expressed as:

$$g(\phi) = \sum_{k=0}^{K-1} e^{-jka\cos(\phi - \phi k) + \alpha_k}$$

where K is the number of outer antenna elements, a is the radius of the array, $\emptyset k$ is the angle from the center of the array to the $k_{th}$ radiating element, and $\alpha_k$ is the phase of the $k_{th}$ element. If the elements are phased in increments of 90 degrees (e.g., E1 phase=0, E2 phase=90, E2 phase=180, and E3 phase=270) then $g(\phi)$ will be an omnidirectional pattern (e.g., the antenna array provides constant gain over azimuth).

Figure 4:
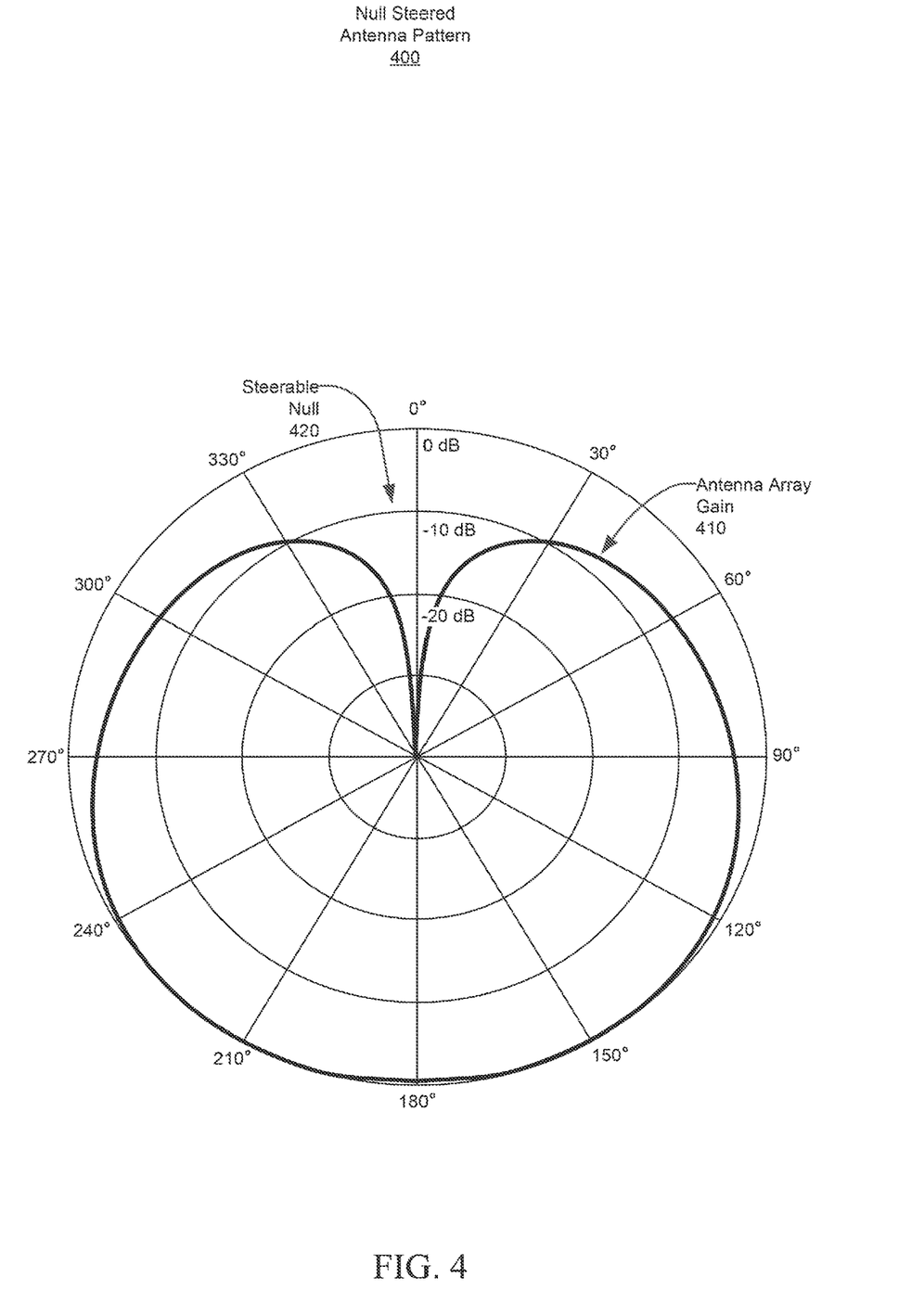
FIG. 4 illustrates a null steered antenna pattern, in accordance with certain embodiments of the present disclosure.

During operation of the antenna array in the steered directional mode, however, the fifth antenna element is also employed/activated. The phase of the fifth antenna element is adjusted to control the direction of the steerable null. The amplitude of the fifth central element is chosen to form a null in the beam pattern of the four element array by increasing the relative amplitude of the fifth element to account for loss from the center element to the four outer elements spaced at radius a. The angle of the null, in the azimuth, is determined by the phase of the fifth element which will cancel with the outer four element array at a unique angle. Changing the phase of the central element can provide a null, in the radiation pattern, at any desired angle. For example, setting the phase of the fifth element to zero degrees results in a null at zero degrees (as illustrated in FIG. 4). Similarly, setting the phase of the fifth element to 90 degrees results in a null at 90 degrees, and so forth.

Although an antenna array comprising four outer antenna elements and a fifth inner element is described above, in other embodiments, a greater (or lesser) number of antenna elements may be used depending on the application and based on consideration of the tradeoff between cost/complexity versus antenna gain and directionality.

FIG. 4 illustrates a null steered antenna beam pattern 400, in accordance with certain embodiments of the present disclosure. The beam pattern, or antenna array gain, 410 is shown as the cardioid shapes line. In this example, the steerable null 420 is generated at zero degrees azimuth. The maximum gain is shown to be 0 dB at 180 degrees (e.g., the opposite direction of the null) while the gain tapers off to −3 dB at 90 degrees and 270 degrees. In this example, the 3 dB gain in the desired direction results in a reduction of the transponder RF Output from 500 W to 250 W.

Methodology

Figure 5:
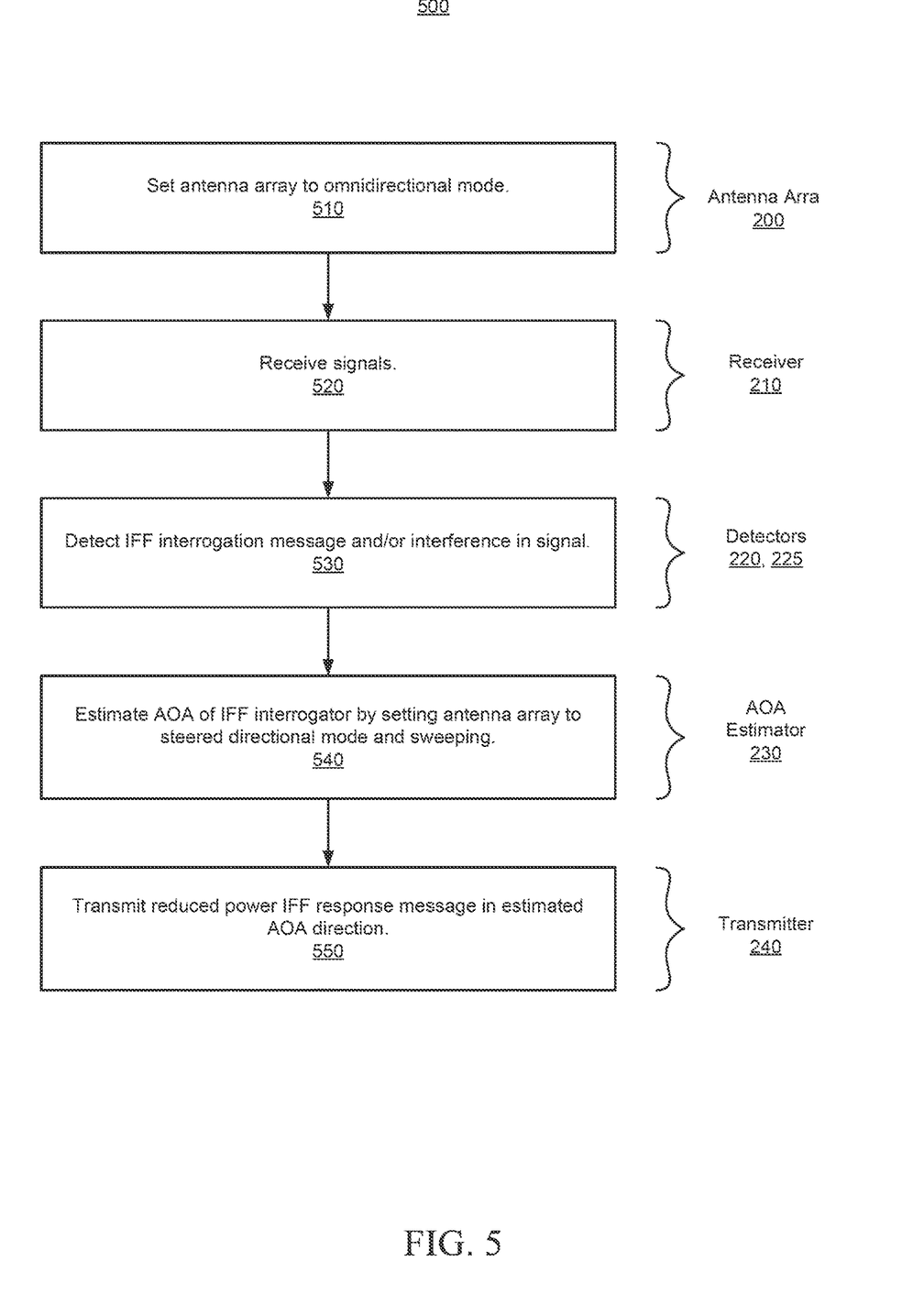
FIG. 5 is a flowchart illustrating a methodology for operation of a directional IFF transponder, in accordance with an embodiment of the present disclosure.

FIG. 5 is a flowchart illustrating a methodology 500 for operation of a directional IFF transponder, in accordance with an embodiment of the present disclosure. As can be seen, example method 500 includes a number of phases and sub-processes, the sequence of which may vary from one embodiment to another. However, when considered in aggregate, these phases and sub-processes form a process for operation of a directional IFF transponder, in accordance with certain of the embodiments disclosed herein, for example as illustrated in FIGS. 1-4, as described above. However other system architectures can be used in other embodiments, as will be apparent in light of this disclosure. To this end, the correlation of the various functions shown in FIG. 5 to the specific components illustrated in the figures, is not intended to imply any structural and/or use limitations. Rather other embodiments may include, for example, varying degrees of integration wherein multiple functionalities are effectively performed by one system. Numerous variations and alternative configurations will be apparent in light of this disclosure.

In one embodiment, method 500 commences, at operation 510, by controlling an antenna array to operate in an omnidirectional mode. In some embodiments, the antenna array comprises four antenna elements disposed in a circular pattern and a fifth antenna element disposed within the circular pattern, wherein the four outer elements are employed for operation in the omnidirectional mode and the fifth inner element is activated for use during a steered directional mode.

At operation 520, signals are received through the antenna array operating in the omnidirectional mode. At operation 530, an IFF interrogation message is detected in the received signals.

At operation 540, an AOA of the IFF interrogation message (e.g., the direction to the IFF interrogator platform) is estimated by controlling the antenna array to operate in the steered directional mode. In some embodiments, the AOA is estimated by sweeping a steerable null of the antenna array through a range of angles to determine an angle associated with a lowest received power of the IFF interrogation message.

At operation 550, a reduced power IFF response message is transmitted in the estimated AOA direction, for example, by adjusting the steerable null of the antenna array to a direction opposite the estimated AOA. The transmit power reduction is based on a steering gain of the antenna array. In some embodiments, the steering gain of the antenna array is in the range of 3 dB to 6 dB and the transmit power reduction is proportional to the steering gain.

In some embodiments, additional operations may be performed, as previously described in connection with the system. For example, interfering (e.g., jamming) signals may also be detected while operating the antenna array in the omnidirectional mode, and an AOA of the source of the interfering signal may be estimated in the same manner as described above for the interrogation signal (e.g., sweeping the steerable null to find the lowest received power of the interfering signal). The null may then be maintained in the direction of the interfering signal source (e.g., a jamming platform) to counteract the jamming effect, while transmitting the IFF response message.

In some embodiments, a steering direction may be provided by alternate sources, such as, for example, an aircraft collision avoidance system, and the transmitter may be configured to steer an IFF Interrogation message in that direction.

Example System

Figure 6:
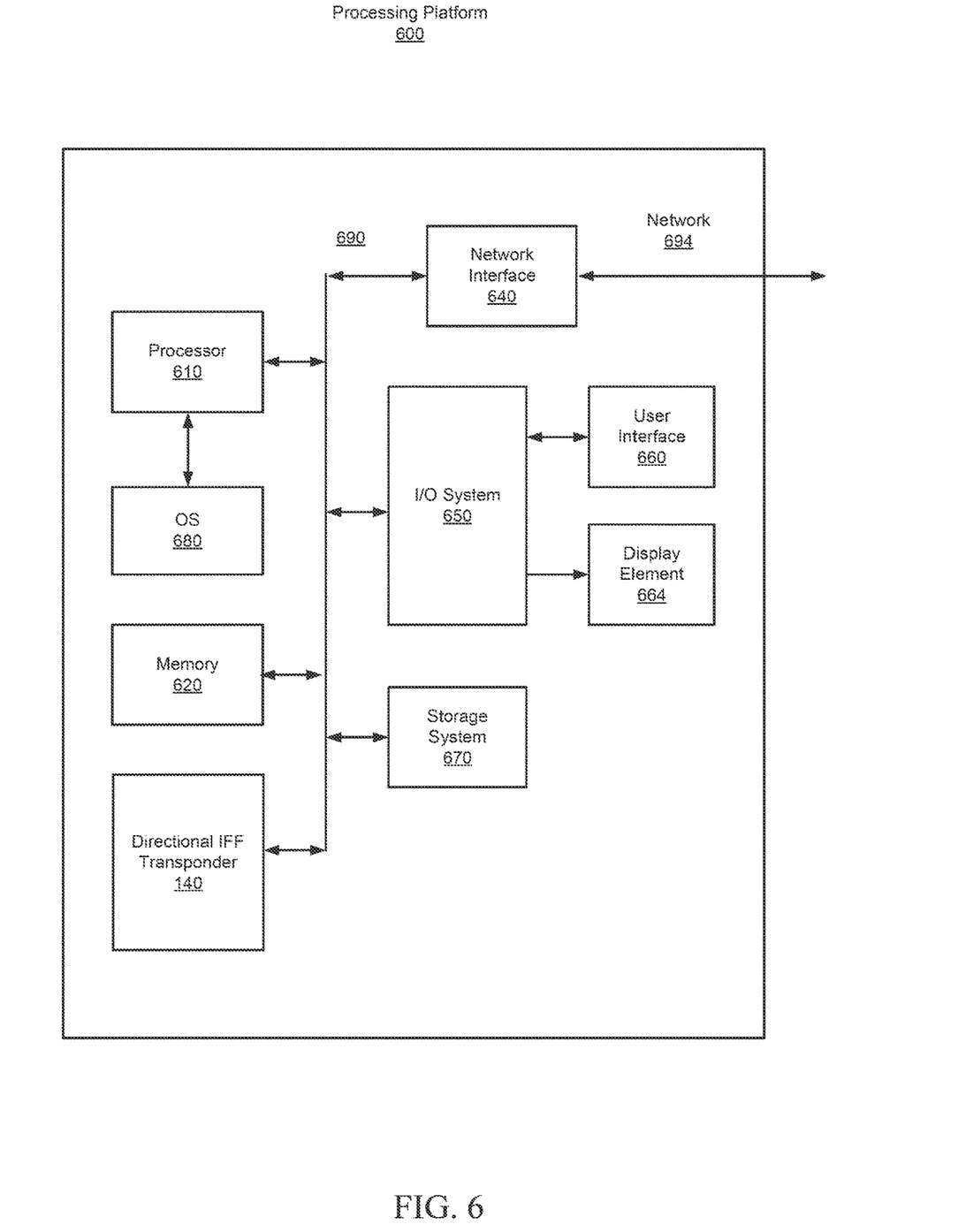
FIG. 6 is a block diagram of a processing platform configured to provide a directional IFF transponder capability, in accordance with an embodiment of the present disclosure.

FIG. 6 is a block diagram of a processing platform 600 configured to provide a directional IFF transponder capability, in accordance with an embodiment of the present disclosure. In some embodiments, platform 600, or portions thereof, may be hosted on, or otherwise be incorporated into the electronic systems of an aircraft or ship, including radar systems, communication systems, and the like. The disclosed techniques may be used to reduce transmission power of the transponder signal and decrease the likelihood of interception by adversarial forces.

In some embodiments, platform 600 may comprise any combination of a processor 610, memory 620, directional IFF transponder 140, a network interface 640, an input/output (I/O) system 650, a user interface 660, a display element 664, and a storage system 670. As can be further seen, a bus and/or interconnect 690 is also provided to allow for communication between the various components listed above and/or other components not shown. Platform 600 can be coupled to a network 694 through network interface 640 to allow for communications with other computing devices, platforms, devices to be controlled, or other resources. Other componentry and functionality not reflected in the block diagram of FIG. 6 will be apparent in light of this disclosure, and it will be appreciated that other embodiments are not limited to any particular hardware configuration.

Processor 610 can be any suitable processor, and may include one or more coprocessors or controllers, such as an audio processor, a graphics processing unit, or hardware accelerator, to assist in the execution of mission software and/or any control and processing operations associated with platform 600, including control of the directional IFF transponder system 140. In some embodiments, the processor 610 may be implemented as any number of processor cores. The processor (or processor cores) may be any type of processor, such as, for example, a micro-processor, an embedded processor, a digital signal processor (DSP), a graphics processor (GPU), a tensor processing unit (TPU), a network processor, a field programmable gate array or other device configured to execute code. The processors may be multithreaded cores in that they may include more than one hardware thread context (or "logical processor") per core. Processor 610 may be implemented as a complex instruction set computer (CISC) or a reduced instruction set computer (RISC) processor. In some embodiments, processor 610 may be configured as an x86 instruction set compatible processor.

Memory 620 can be implemented using any suitable type of digital storage including, for example, flash memory and/or random access memory (RAM). In some embodiments, the memory 620 may include various layers of memory hierarchy and/or memory caches as are known to those of skill in the art. Memory 620 may be implemented as a volatile memory device such as, but not limited to, a RAM, dynamic RAM (DRAM), or static RAM (SRAM) device. Storage system 670 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device.

Processor 610 may be configured to execute an Operating System (OS) 680 which may comprise any suitable operating system, such as Google Android (Google Inc., Mountain View, CA), Microsoft Windows (Microsoft Corp., Redmond, WA), Apple OS X (Apple Inc., Cupertino, CA), Linux, or a real-time operating system (RTOS). As will be appreciated in light of this disclosure, the techniques provided herein can be implemented without regard to the particular operating system provided in conjunction with platform 600, and therefore may also be implemented using any suitable existing or subsequently-developed platform.

Network interface circuit 640 can be any appropriate network chip or chipset which allows for wired and/or wireless connection between other components of platform 600 and/or network 694, thereby enabling platform 600 to communicate with other local and/or remote computing systems, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution) and 5G, Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 650 may be configured to interface between various I/O devices and other components of platform 600. I/O devices may include, but not be limited to, user interface 660 and display element 664. User interface 660 may include devices (not shown) such as a touchpad, cockpit display unit, keyboard, and mouse, etc., for example, to allow the user to control the system. Display element 664 may be configured to display information to a user. I/O system 650 may include a graphics subsystem configured to perform processing of images for rendering on the display element 664. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 610 or any chipset of platform 600.

It will be appreciated that in some embodiments, the various components of platform 600 may be combined or integrated in a system-on-a-chip (SoC) architecture. In some embodiments, the components may be hardware components, firmware components, software components or any suitable combination of hardware, firmware or software.

Directional IFF transponder 140 is configured to employ a steerable antenna array to determine an AOA of an interrogation signal and transmit a response in that direction at a reduced power level, as described previously. Directional IFF transponder 140 may include any or all of the circuits/components illustrated in FIGS. 1-4, as described above. These components can be implemented or otherwise used in conjunction with a variety of suitable software and/or hardware that is coupled to or that otherwise forms a part of platform 600. These components can additionally or alternatively be implemented or otherwise used in conjunction with user I/O devices that are capable of providing information to, and receiving information and commands from, a user.

In various embodiments, platform 600 may be implemented as a wireless system, a wired system, or a combination of both. When implemented as a wireless system, platform 600 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, platform 600 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 694. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments platform 600 may comprise additional, fewer, or alternative subcomponents as compared to those included in the example embodiment of FIG. 6.

The aforementioned non-transitory computer readable medium may be any suitable medium for storing digital information, such as a hard drive, a server, a flash memory, and/or random-access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method, process, and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical entities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smartphones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood, however, that other embodiments may be practiced without these specific details, or otherwise with a different set of details. It will be further appreciated that the specific structural and functional details disclosed herein are representative of example embodiments and are not necessarily intended to limit the scope of the present disclosure. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is an Identification Friend or Foe (IFF) transponder system comprising: an antenna array configured to operate in one of an omnidirectional mode or a steered directional mode; a receiver configured to control the antenna array to operate in the omnidirectional mode and to receive signals provided through the antenna array while operating in the omnidirectional mode; a detector configured to detect an IFF interrogation message in the received signals; an angle of arrival (AOA) estimator configured to control the antenna array to operate in the steered directional mode to estimate an AOA of the IFF interrogation message; and a transmitter configured to control the antenna array to operate in the steered directional mode to transmit an IFF response message in the estimated AOA direction, wherein transmit power of the IFF response message is based on a steering gain of the antenna array.

Example 2 includes the system of Example 1, wherein the antenna array is configured to provide an antenna pattern that includes a steerable null when operated in the steered directional mode and the AOA estimator is configured sweep the steerable null through a range of angles to determine an angle associated with a lowest received power of the IFF interrogation message to estimate the AOA.

Example 3 includes the system of Examples 1 or 2, wherein the antenna array is configured to provide an antenna pattern that includes a steerable null when operated in the steered directional mode and the transmitter is configured to adjust the steerable null to a direction opposite the estimated AOA for transmitting the IFF response message.

Example 4 includes the system of any of Examples 1-3, wherein the antenna array comprises four antenna elements disposed in a circular pattern and a fifth antenna element disposed within the circular pattern.

Example 5 includes the system of Example 4, wherein the four antenna elements disposed in the circular pattern are employed during operation of the antenna array in the omnidirectional mode, while the fifth antenna element is unused.

Example 6 includes the system of Example 4, wherein the four antenna elements disposed in the circular pattern and the fifth antenna element disposed within the circular pattern are employed during operation of the antenna array in the steered directional mode, and a phase of the fifth antenna element is adjusted to control direction of a steerable null.

Example 7 includes the system of any of Examples 1-6, wherein the steering gain of the antenna array is in the range of 3 decibels (dB) to 6 dB and the transmit power is set based on an amount proportional to the steering gain.

Example 8 is a method for operating an Identification Friend or Foe (IFF) transponder system, the method comprising: controlling, by a processor-based system, an antenna array to operate in an omnidirectional mode; receiving, by the processor-based system, signals provided through the antenna array operating in the omnidirectional mode; detecting, by the processor-based system, an IFF interrogation message in the received signals; estimating, by the processor-based system, an angle of arrival (AOA) of the IFF interrogation message by controlling the antenna array to operate in a steered directional mode, wherein the antenna array is configured to provide an antenna pattern that includes a steerable null when operated in the steered directional mode; and transmitting, by the processor-based system, an IFF response message in the estimated AOA direction, wherein transmit power of the IFF response message is based on a steering gain of the antenna array.

Example 9 includes the method of Example 8, further comprising estimating the AOA by sweeping the steerable null through a range of angles to determine an angle associated with a lowest received power of the IFF interrogation message.

Example 10 includes the method of Examples 8 or 9, further comprising transmitting the IFF response message by adjusting the steerable null to a direction opposite the estimated AOA.

Example 11 includes the method of any of Examples 8-10, wherein the antenna array comprises four antenna elements disposed in a circular pattern and a fifth antenna element disposed within the circular pattern.

Example 12 includes the method of Example 11, further comprising employing the four antenna elements disposed in the circular pattern during operation of the antenna array in the omnidirectional mode, while the fifth antenna element is unused.

Example 13 includes the method of Example 11, further comprising: employing the four antenna elements disposed in the circular pattern and the fifth antenna element disposed within the circular pattern during operation of the antenna array in the steered directional mode; and adjusting a phase of the fifth antenna element to control direction of a steerable null.

Example 14 includes the method of any of Examples 8-13, wherein the steering gain of the antenna array is in the range of 3 decibels (dB) to 6 dB and the transmit power is set based on an amount proportional to the steering gain.

Example 15 includes the method of any of Examples 8-14, further comprising: detecting an interfering signal in the received signals; estimating an AOA of the interfering signal by sweeping the steerable null through a range of angles to determine an angle associated with a lowest received power of the interfering signal; and adjusting the steerable null to the estimated AOA of the interfering signal.

Example 16 includes the method of any of Examples 8-15, further comprising: receiving a desired transmission direction from an aircraft collision avoidance system; adjusting the steerable null to a direction opposite the desired transmission direction; and transmitting an IFF interrogation message.

Example 17 is a computer program product including one or more non-transitory machine-readable mediums encoded with instructions that when executed by one or more processors cause a process to be carried out for operating an Identification Friend or Foe (IFF) transponder, the process comprising: controlling an antenna array to operate in an omnidirectional mode; receiving signals provided through the antenna array operating in the omnidirectional mode; detecting an IFF interrogation message in the received signals; estimating an angle of arrival (AOA) of the IFF interrogation message by controlling the antenna array to operate in a steered directional mode; and transmitting an IFF response message in the estimated AOA direction, wherein transmit power of the IFF response message is based on a steering gain of the antenna array.

Example 18 includes the computer program product of Example 17, wherein the process further comprises estimating the AOA by sweeping a steerable null of the antenna array through a range of angles to determine an angle associated with a lowest received power of the IFF interrogation message.

Example 19 includes the computer program product of Examples 17 or 18, wherein the process further comprises transmitting the IFF response message by adjusting a steerable null of the antenna array to a direction opposite the estimated AOA.

Example 20 includes the computer program product of any of Examples 17-19, wherein the steering gain of the antenna array is in the range of 3 decibels (dB) to 6 dB and the transmit power is set based on an amount proportional to the steering gain.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be appreciated in light of this disclosure. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. An Identification Friend or Foe (IFF) transponder system comprising:
   an antenna array configured to operate in one of an omnidirectional mode or a steered directional mode;
   a receiver configured to control the antenna array to operate in the omnidirectional mode and to receive signals provided through the antenna array while operating in the omnidirectional mode;
   a detector configured to detect an IFF interrogation message in the received signals;
   an angle of arrival (AOA) estimator configured to control the antenna array to operate in the steered directional mode to estimate an AOA of the IFF interrogation message; and
   a transmitter configured to control the antenna array to operate in the steered directional mode to transmit an IFF response message in the estimated AOA direction, wherein transmit power of the IFF response message is based on a steering gain of the antenna array.

2. The system of claim 1, wherein the antenna array is configured to provide an antenna pattern that includes a steerable null when operated in the steered directional mode and the AOA estimator is configured sweep the steerable null through a range of angles to determine an angle associated with a lowest received power of the IFF interrogation message to estimate the AOA.

3. The system of claim 1, wherein the antenna array is configured to provide an antenna pattern that includes a steerable null when operated in the steered directional mode and the transmitter is configured to adjust the steerable null to a direction opposite the estimated AOA for transmitting the IFF response message.

4. The system of claim 1, wherein the antenna array comprises four antenna elements disposed in a circular pattern and a fifth antenna element disposed within the circular pattern.

5. The system of claim 4, wherein the four antenna elements disposed in the circular pattern are employed during operation of the antenna array in the omnidirectional mode, while the fifth antenna element is unused.

6. The system of claim 4, wherein the four antenna elements disposed in the circular pattern and the fifth antenna element disposed within the circular pattern are employed during operation of the antenna array in the steered directional mode, and a phase of the fifth antenna element is adjusted to control direction of a steerable null.

7. The system of claim 1, wherein the steering gain of the antenna array is in the range of 3 decibels (dB) to 6 dB and the transmit power is set based on an amount proportional to the steering gain.

8. A method for operating an Identification Friend or Foe (IFF) transponder system, the method comprising:
   controlling, by a processor-based system, an antenna array to operate in an omnidirectional mode;
   receiving, by the processor-based system, signals provided through the antenna array operating in the omnidirectional mode;
   detecting, by the processor-based system, an IFF interrogation message in the received signals;
   estimating, by the processor-based system, an angle of arrival (AOA) of the IFF interrogation message by controlling the antenna array to operate in a steered directional mode, wherein the antenna array is configured to provide an antenna pattern that includes a steerable null when operated in the steered directional mode; and
   transmitting, by the processor-based system, an IFF response message in the estimated AOA direction, wherein transmit power of the IFF response message is based on a steering gain of the antenna array.

9. The method of claim 8, further comprising estimating the AOA by sweeping the steerable null through a range of angles to determine an angle associated with a lowest received power of the IFF interrogation message.

10. The method of claim 8, further comprising transmitting the IFF response message by adjusting the steerable null to a direction opposite the estimated AOA.

11. The method of claim 8, wherein the antenna array comprises four antenna elements disposed in a circular pattern and a fifth antenna element disposed within the circular pattern.

12. The method of claim 11, further comprising employing the four antenna elements disposed in the circular pattern during operation of the antenna array in the omnidirectional mode, while the fifth antenna element is unused.

13. The method of claim 11, further comprising: employing the four antenna elements disposed in the circular pattern and the fifth antenna element disposed within the circular pattern during operation of the antenna array in the steered directional mode; and adjusting a phase of the fifth antenna element to control direction of a steerable null.

14. The method of claim 8, wherein the steering gain of the antenna array is in the range of 3 decibels (dB) to 6 dB and the transmit power is set based on an amount proportional to the steering gain.

15. The method of claim 8, further comprising:
   detecting an interfering signal in the received signals;
   estimating an AOA of the interfering signal by sweeping the steerable null through a range of angles to determine an angle associated with a lowest received power of the interfering signal; and
   adjusting the steerable null to the estimated AOA of the interfering signal.

16. The method of claim 8, further comprising:
   receiving a desired transmission direction from an aircraft collision avoidance system;
   adjusting the steerable null to a direction opposite the desired transmission direction; and
   transmitting an IFF interrogation message.

17. A computer program product including one or more non-transitory machine-readable mediums encoded with instructions that when executed by one or more processors cause a process to be carried out for operating an Identification Friend or Foe (IFF) transponder, the process comprising:

controlling an antenna array to operate in an omnidirectional mode;

receiving signals provided through the antenna array operating in the omnidirectional mode;

detecting an IFF interrogation message in the received signals;

estimating an angle of arrival (AOA) of the IFF interrogation message by controlling the antenna array to operate in a steered directional mode; and     transmitting an IFF response message in the estimated AOA direction, wherein transmit power of the IFF response message is based on a steering gain of the antenna array.

18. The computer program product of claim 17, wherein the process further comprises estimating the AOA by sweeping a steerable null of the antenna array through a range of angles to determine an angle associated with a lowest received power of the IFF interrogation message.

19. The computer program product of claim 17, wherein the process further comprises transmitting the IFF response message by adjusting a steerable null of the antenna array to a direction opposite the estimated AOA.

20. The computer program product of claim 17, wherein the steering gain of the antenna array is in the range of 3 decibels (dB) to 6 dB and the transmit power is set based on an amount proportional to the steering gain.

* * * * *